3,694,176
POLYMERS COMPRISING ETHYLENE AND ETHYLENICALLY UNSATURATED DICARBOXYLIC ACIDS OR ESTERS THEREOF, AND OIL COMPOSITIONS CONTAINING SAID POLYMERS
Harold N. Miller, Millington, N.J., assignor to Esso Research and Engineering Company
No Drawing. Filed Apr. 1, 1968, Ser. No. 717,916
Int. Cl. C10l 1/18
U.S. Cl. 44—62       4 Claims

ABSTRACT OF THE DISCLOSURE

Polymers comprising a major molar amount of ethylene and a minor molar amount of an alpha-beta ethylenically unsaturated dicarboxylic type monomer such as: dicarboxylic acid, or its anhydride, or a mono or diester thereof, having a number average molecular weight of about 500 to 50,000 are useful as wax crystal modifiers in petroleum oil.

BACKGROUND OF THE INVENTION

Field of the invention

The present invention relates to polymers comprising a major molar amount of ethylene and a minor molar amount of an unsaturated dicarboxylic acid, or ester of an unsaturated dicarboxylic acid, which polymers are useful as wax crystal modifiers, e.g., pour depressants, and dewaxing aids, for hydrocarbon oils.

Description of the prior art

Copolymers of ethylene with unsaturated diesters, such as diethyl fumarate and diethyl maleate, are taught as heat seal improvers for petroleum waxes in U.S. Pat. 3,165,485. Copolymers of ethylene with dodecyl fumarate are taught as viscosity index improvers for lubricating oil in U.S. Pat. 2,327,705. The present invention differs from the aforesaid prior art in that ethylene copolymerized with unsaturated diesters, or monoesters of dicarboxylic acids, or dicarboxylic acids or anhydrides per se, in certain molar proportions and certain molecular weight ranges are effective as wax crystal modifiers in certain hydrocarbon oils.

Another group of prior art patents is represented by U.S. Pats. 3,304,261 and 3,341,309 which teach as wax crystal modifiers, terpolymers of ethylene, vinyl esters such as vinyl acetate and alkyl fumarates. The present invention differs from these patents in the finding that copolymers of ethylene and fumarates without the vinyl ester forms useful wax crystal modifiers.

SUMMARY OF THE INVENTION

The polymers of the invention will comprise a mixture consisting of 50 to 99, preferably 70 to 99, e.g., 90 to 99, mole percent ethylene and about 50 to 1, preferably 1 to 30, mole percent of copolymerizable alpha-beta ethylenically unsaturated dicarboxylic acid per se, or its anhydride, or mono- or diester of said dicarboxylic acid, said polymers being oil-soluble and having a number average molecular weight in the range of about 500 to 50,000, preferably about 500 to about 8,000, and most preferably about 500 to 3,000, as measured by Vapor Phase Osmometry (VPO).

The unsaturated mono- or diester, or dicarboxylic acid or anhydride monomers, copolymerizable with ethylene, include those materials of the general formulas:

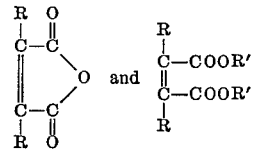

wherein each R is hydrogen or methyl, and wherein R' is hydrogen or a $C_1$ to $C_{16}$ straight or branched chain alkyl group, e.g. a $C_2$ to $C_4$ alkyl group. Examples of such materials include both cis and trans compounds such as maleic anhydride; fumaric acid; dimethyl maleate; diethyl fumarate; methyl, ethyl fumarate; diisopropyl fumarate, di-(-n-pentyl) fumarate; di-($C_8$ Oxo) fumarate; dilauryl maleate; the mono methyl ester of fumaric acid, i.e. one R' is hydrogen and the other is methyl; the mono n-octyl ester of maleic acid; etc.

Small amounts, e.g., 0.1 to 20 mole percent of other non-ester monomers can be included in the polymer such as $C_3$ to $C_{16}$ alpha monoolefins, either branched or straight chain, such as propylene, n-octene-1, n-decene-1, etc.

The Oxo alcohols mentioned above are isomeric mixtures of branched chain aliphatic primary alcohols prepared from olefins, such as polymers and copolymers of $C_3$ to $C_4$ monoolefins, reacted with CO and hydrogen in the presence of a cobalt-containing catalyst such as cobalt carbonyl, at temperatures of about 300 to 400° F., under pressures of about 1000 to 3000 p.s.i. to form aldehydes. The resulting aldehyde product is then hydrogenated to form the Oxo alcohol which is then recovered by distillation from the hydrogenated product.

In general, the polymerizations of ethylene with the alpha-beta unsaturated dicarboxylic type monomer can be carried out as follows:

Solvent and the unsaturated dicarboxylic monomer, i.e. mono- or diester or dicarboxylic acid or anhydride as previously described, are charged to a stainless steel pressure vessel which is equipped with a stirrer. The temperature of the pressure vessel is then brought to be desired reaction temperature and pressured to the desired pressure with ethylene. Catalyst, can be added initially to the vessel along with the solvent, or continuously, or periodically, during the course of the reaction. Also during the reaction time, as ethylene is consumed in the polymerization reaction, additional ethylene is supplied through a pressure controlling regulator so as to maintain the desired reaction pressure at a fairly constant level at all times. Following the completion of the reaction, the liquid phase of the pressure vessel is distilled to remove the solvent and other volatile constituents of the reacted mixture, leaving the polymer as residue. A useful modification of this procedure is to add to the pressure vessel 0 to 50% of the total dicarboxylic acid component with the solvent at the beginning of the reaction and then to add the remainder of the dicarboxylic acid component continuously or periodically over the course of the reaction.

Usually based upon 100 parts by weight of polymer to be produced, then about 100 to 600 parts by weight of solvent, and about 1 to 20 parts by weight of catalyst, will be used.

The solvent can be any non-reactive organic solvent for furnishing a liquid phase reaction, and preferably is a hydrocarbon solvent such as benzene, hexane, etc.

In general, the catalyst can be any of the conventional free radical catalysts, such as peroxide or azo-type catalyst, for example: benzoyl peroxide, ditertiary butyl peroxide, tertiary butyl hydroperoxide, diacetyl peroxide, azodiisobutyronitrile, etc.

The temperature used during the reaction will depend upon the stability of the catalyst and will be chosen so as to produce the desired rate of decomposition of the selected catalyst. This temperature can range from room temperature, i.e. about 70° F. for diethyl peroxycarbonate to as high as 200° C. for the more stable free radical initiators. A preferred catalyst, because of its high yield or polymer per pound of catalyst, is di-t-butyl peroxide which is used preferably at 280–320° F.

The pressures employed can range between 500 to 30,000 p.s.i.g., preferably 600 to 10,000 p.s.i.g., and most preferably about 600 to 3,000 p.s.i.g. As previously indicated, this pressure can be attained by maintaining a fairly continuous and constant pressure on the reaction chamber through controlling the inlet feed of ethylene.

The time of reaction will depend upon, and is interrelated to, the temperature of the reaction, the choice of catalyst, and the pressure employed. In general, however, 1 to 10 hours will complete the reaction.

The polymers of the invention will generally be added to hydrocarbon oils in amounts of .001 to 2 wt. percent, generally .005 to about 0.5 wt. percent, said wt. percent being based upon the weight of the oil to be treated.

The hydrocarbon oils, which are treated for pour depression with the polymers of this invention, include distillate oils such as cracked and virgin middle distillate fuels boiling in the range of 250° to 750° F., such as heating oil, diesel fuel oil, etc. In addition, the polymers of the invention can be used as a dewaxing aid during dewaxing of distillate lube oil stocks, for example light distillate lube oil stocks boiling in the 600–1000° F. range, in the manner similar to that taught in U.S. Pat. 3,262,973.

The polymers of the invention may be used alone as the sole oil additive, or in combination with other oil additive such as other pour depressants or dewaxing aids, corrosion inhibitors, antioxidants, sludge inhibitors, etc.

The invention will be further understood by reference to the following examples which include preferred embodiments of the invention.

EXAMPLE I

A copolymer of ethylene and di-n-butyl fumarate was prepared as follows:

A stirred autoclave was charged with 800 ml. of benzene as solvent, then pressurized with ethylene to 1,000 p.s.i. while heated to 150° C. 50 ml. per hour, for two hours, of di-n-butyl fumarate was added to the autoclave for a total of 89 grams of fumarate. 20 ml. per hour of a catalyst solution consisting of 23 wt. percent di-tertitary butyl peroxide dissolved in 77 wt. percent benzene was also pumped into the autoclave during the two hour period fumarate was added and for another ¼ hour after the fumarate feed ceased. After the last of the catalyst solution was added, the entire reaction mixture was heat soaked, i.e. maintained at 150° C., for an additional ½ hour. During all this time, ethylene was pressured into the reactor so as to maintain the pressure continuously at 1,000 p.s.i.g. At the end of the 2¾ hours from the start of the reaction, the reactor was depressurized and the contents discharged. The benzene solvent was evaporated over a steam bath while blowing with nitrogen, to leave the copolymer product. Analysis of the copolymer showed that it contained 43 wt. percent of di(n-butyl)fumarate, 57 wt. percent ethylene and had a molecular weight, as measured by Vapor Phase Osmometry, of 740.

EXAMPLE II

A copolymer of ethylene and di-isobutyl fumarate was prepared in the same general procedure used in Example I, except that the ethylene pressure was maintained at 2,000 p.s.i.g., the di-isobutyl fumarate was fed at the rate of 30 ml. per hour for 2 hours or a total of 52 grams of fumarate, the catalyst solution consisting of 4.6 wt. percent di-tertiary butyl peroxide dissolved in 95.4 wt. percent of benzene was added at the rate of 96 ml. per hour for two hours, after which the reaction mixture was heat soaked for ½ hour at 150° C. The isobutyl portion of the fumarate was obtained from tertiary butyl alcohol.

EXAMPLE III

A copolymer of ethylene and diethyl fumarate was prepared by charging the reactor with 788 grams of benzene as solvent, 20 grams of diethyl fumarate, 2 grams of ditertiary butyl peroxide and ethylene to a pressure of 750 p.s.i.g. The reactor was heated for 330 minutes at 150° C. The reactor was depressurized and the contents discharged. Benzene was evaporated over a steam bath while blowing with nitrogen to leave a copolymer product having a molecular weight of 1200.

EXAMPLES IV and V

Copolymers of ethylene and maleic anhydride and diethyl maleate were prepared in the same general manner as the copolymer of Example III except for the differences noted in Table I.

The copolymers of Examples I and II were tested for pour depression ability in a middle distillate heating oil, having a cloud point of 25° F., an aniline point of 135° F., a density of 0.8622 g./ml. at 25° C., a viscosity of 3.11 cs. at 100° F., boiling in the range of 370° to 644° F. and having a pour point of +20° F. The copolymers of Examples III to V were tested in a different middle distillate heating oil which was a 50/50 straight run/cracked fuel having a cloud point of 4° F., an aniline point of 132.0° F. and API gravity of 33.0, a viscosity of 34.2 SUS. @100° F., boiling within the range between about 340° and 636° F. and having a pour point of −5° F.

The copolymers prepared, and their effectiveness as pour depressants are summarized in the following Table I.

TABLE I

| Example | I | II | III | IV | V |
|---|---|---|---|---|---|
| Di-n-butyl fumarate, grams | 89 | | | | |
| Di-iso-butyl fumarate, grams | | 52 | | | |
| Di-ethyl fumarate, grams | | | 20 | | |
| Maleic anhydride, grams | | | | 50 | |
| Di-ethyl maleate, grams | | | | | 88 |
| Benzene, ml | 800 | 800 | 788 | 945 | 1,663 |
| Di-tert. butyl peroxide, grams | 5 | 9 | 2.0 | 5.0 | 8.8 |
| Pressure p.s.i.g | 1,000 | 2,000 | 750 | 750 | 1,050 |
| Temperature, ° C | 150 | 150 | 150 | 150 | 150 |
| Total time, minutes | 165 | 150 | 330 | 300 | 195 |
| Molecular weight (VPO) | 740 | 1,410 | 1,200 | 751 | 1,541 |
| Weight percent, ethylene | 57 | 87 | 88.8 | 94.5 | 88.6 |
| Weight percent, ester | 43 | 13 | 11.2 | 5.5 | 11.4 |
| Molecular percent, ethylene | 92 | 98.2 | 98.2 | 98.3 | 98.0 |
| Fuel oil. ASTM pour point, ° F | +20 | +20 | −5 | −5 | −5 |
| .05 weight percent copolymer, ° F | −10 | −5 | −15 | −15 | −20 |
| .10 weight percent copolymer, ° F | −40 | −20 | −20 | −15 | −30 |

What is claimed is:

1. A composition comprising a major proportion of fuel oil consisting essentially of distillate petroleum fuel oil boiling in the range of 250° to 750° F., and about 0.001 to 2.0 wt. percent of an oil-soluble pour depressing copolymer consisting essentially of about 70 to 99 mole percent ethylene, and about 1 to 30 mole percent alpha-beta ethylenically unsaturated polymerizable material selected from the group consisting of:

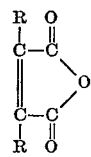

wherein each R is selected from the group consisting of hydrogen and methyl, and each R' is selected from the group consisting of hydrogen and $C_1$ to $C_4$ alkyl radicals, said copolymer having a number average molecular weight in the range of about 500 to 50,000.

2. A composition according to claim 1, wherein said molecular weight is about 500 to 3,000.

3. A composition according to claim 2, wherein said copolymer contains about 90 to about 99 mole percent ethylene.

4. A composition according to claim 3, wherein said polymerizable material is a fumarate diester wherein R' is an alkyl group of 2 to 4 carbon atoms.

References Cited

UNITED STATES PATENTS

| 2,543,964 | 3/1951 | Giammaria | 252—56 |
| 2,977,334 | 3/1961 | Zopf et al. | 260—78.5 |
| 2,992,987 | 7/1961 | Fields | 260—78.5 |
| 3,165,485 | 1/1965 | Ullnyckyj et al. | 260—78.5 HC |

FOREIGN PATENTS

| 1,154,966 | 6/1969 | Great Britain | 44—62 |

DANIEL E. WYMAN, Primary Examiner

Y. H. SMITH, Assistant Examiner

U.S. Cl. X.R.

44—70; 208—28; 252—56

CERTIFICATE OF CORRECTION

Patent No. 3,694,176   Dated September 26, 1972

Inventor(s) Harold N. Miller

It is certified that error appears in the above-identified patent and that said Letters Patent are hereby corrected as shown below:

Claim 1, for

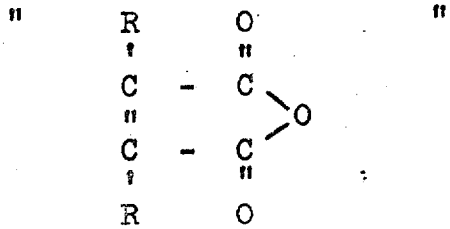

read

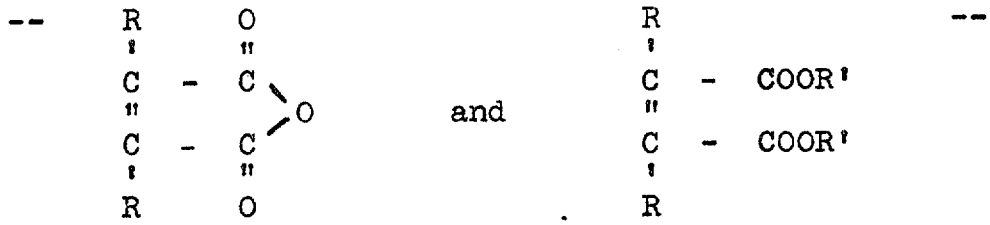

Signed and sealed this 10th day of July 1973.

SEAL)
ttest:

DWARD M. FLETCHER, JR.       Rene Tegtmeyer
ttesting Officer             Acting Commissioner of Patents